United States Patent
Sato et al.

(10) Patent No.: US 10,101,177 B2
(45) Date of Patent: Oct. 16, 2018

(54) POSITION DETECTING DEVICE

(71) Applicant: AISIN SEIKI KABUSHIKI KAISHA, Kariya (JP)

(72) Inventors: Shiro Sato, Chiryu (JP); Hirotaka Manabe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 79 days.

(21) Appl. No.: 14/943,409

(22) Filed: Nov. 17, 2015

(65) Prior Publication Data

US 2016/0146635 A1    May 26, 2016

(30) Foreign Application Priority Data

Nov. 26, 2014 (JP) ................. 2014-239375

(51) Int. Cl.
  *G01D 5/14* (2006.01)
  *G01B 7/14* (2006.01)
  *G01B 7/30* (2006.01)
  *G01B 7/00* (2006.01)

(52) U.S. Cl.
  CPC ............ *G01D 5/145* (2013.01); *G01B 7/003* (2013.01); *G01B 7/14* (2013.01); *G01B 7/30* (2013.01); *G01D 5/147* (2013.01)

(58) Field of Classification Search
  CPC . G01B 7/30; G01B 7/14; G01B 7/003; G01D 5/147; G01D 5/145
  USPC .................................................. 324/207.22
  See application file for complete search history.

(56) References Cited

U.S. PATENT DOCUMENTS

| | | | | |
|---|---|---|---|---|
| 5,231,352 A | * | 7/1993 | Huber | G01D 5/145 324/207.13 |
| 5,469,054 A | * | 11/1995 | Bicking | G01B 7/003 324/207.2 |
| 5,574,233 A | * | 11/1996 | Oliver | G01B 11/2408 324/207.14 |
| 5,635,833 A | * | 6/1997 | Onodera | G01B 3/004 324/207.22 |
| 5,824,197 A | * | 10/1998 | Tanaka | C23C 14/046 204/192.12 |
| 5,945,824 A | * | 8/1999 | Obara | F16C 29/005 310/12.09 |
| 6,333,628 B1 | * | 12/2001 | Yeh | F16C 29/005 310/12.19 |
| 6,683,544 B2 | * | 1/2004 | Tokunaga | B60N 2/002 280/735 |
| 6,714,005 B2 | * | 3/2004 | Kimura | G01D 5/145 324/207.2 |
| 9,568,341 B2 | * | 2/2017 | Krause | F16H 59/105 |
| 2003/0117000 A1 | | 6/2003 | Barnabo et al. | |

(Continued)

*Primary Examiner* — Patrick Assouad
*Assistant Examiner* — Christopher McAndrew
(74) *Attorney, Agent, or Firm* — Oblon, McClelland, Maier & Neustadt, L.L.P.

(57) ABSTRACT

A position detecting device includes: a magnet that has a first magnetic pole and a second magnetic pole; a magnetic sensor that detects a change in magnetic flux generated by a detection target which enters between the magnet and the magnetic sensor on the first magnetic pole side of the magnet; and a magnetic shield that has a magnetic gap between the magnet and the magnetic shield, and that includes a magnetic material which is disposed on the second magnetic pole side of the magnet.

9 Claims, 7 Drawing Sheets

(56) References Cited

U.S. PATENT DOCUMENTS

| | | | |
|---|---|---|---|
| 2007/0262770 A1* | 11/2007 | Arns, Jr. | F15B 15/2846 |
| | | | 324/207.22 |
| 2009/0015246 A1* | 1/2009 | Van Bruggen | G01D 5/145 |
| | | | 324/207.22 |
| 2009/0243598 A1* | 10/2009 | O'Day | G01D 5/24409 |
| | | | 324/207.24 |
| 2010/0219813 A1* | 9/2010 | Ito | B60N 2/0232 |
| | | | 324/207.22 |
| 2011/0101970 A1* | 5/2011 | Lanter | G01B 7/003 |
| | | | 324/207.25 |
| 2012/0306479 A1* | 12/2012 | Krause | F16H 59/105 |
| | | | 324/207.11 |

\* cited by examiner

POSITION DETECTING DEVICE

CROSS REFERENCE TO RELATED APPLICATIONS

This application is based on and claims priority under 35 U.S.C. § 119 to Japanese Patent Application 2014-239375, filed on Nov. 26, 2014, the entire contents of which are incorporated herein by reference.

TECHNICAL FIELD

This disclosure relates to a position detecting device.

BACKGROUND DISCUSSION

In the related art, as a position detecting device for detecting a relative position between two members whose positional relationship varies, a position detecting device is known which includes a magnet and a magnetic sensor for detecting a change in magnetic flux generated by a detection target entering between the magnet and the magnetic sensor.

For example, a position detecting device disclosed in U.S. Patent Application Publication No. 2003/0117000 (Reference 1) includes a housing having a pair of arm units which are arranged facing each other, and a magnet and a magnetic sensor which are arranged at two positions apart from each other by being separately held in the respective arm units. For example, the position detecting device is disposed in a vehicle seat sliding device. A configuration is adopted in which the position detecting device functions as a seat position sensor for detecting a relative position of two sliding rails sliding in an extending direction thereof, that is, a seat sliding position.

That is, the housing in the position detecting device is fixed to any one of the sliding rails. For example, a detection target formed of a magnetic material, such as a plate-shaped member made of iron-based metal is disposed in the sliding rail on the other side. Furthermore, the detection target is arranged at a position where the two sliding rails configuring the seat sliding device relatively move so as to cause the detection target to enter and exit between both the arm units of the housing. In this manner, based on a change in the magnetic flux detected by the magnetic sensor, the position detecting device can detect whether the seat sliding position is located either at a first position (for example, a front position) where the detection target enters between both the arm units of the housing, or at a second position (for example, a rear position) where the detection target does not enter between both the arm units.

This position detecting device has a problem in that a foreign substance (magnetic body) attracted by a magnetic force of the magnet may adhere to the housing. Then, the foreign substance enters between the magnetic sensor and the magnet, thereby causing a possibility of erroneous detection.

In view of this point, the above-described position detecting device in the related art is provided with the housing, specifically, a cover for covering an opening between both the arm units. This cover prevents the erroneous detection caused by the entering foreign substance.

However, the above-described technology in the related art adopts a structure in which the detection target pushes and opens the cover member when entering a detection position set between both the arm units. Consequently, when the detection target comes into contact with the cover member, there is a possibility that a contact sound or abrasion powder may be generated. A problem also arises in that providing the cover member may increase the manufacturing cost. In this regard, the above-described technology has room for improvement.

SUMMARY

Thus, a need exists for a position detecting device which is not susceptible to the drawback mentioned above.

A position detecting device according to an aspect of this disclosure preferably includes a magnet that has a first magnetic pole and a second magnetic pole, a magnetic sensor that detects a change in magnetic flux generated by a detection target which enters between the magnet and the magnetic sensor on the first magnetic pole side of the magnet, and a magnetic shield that has a magnetic gap between the magnet and the magnetic shield, and that includes a magnetic material which is disposed on the second magnetic pole side of the magnet.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a position detecting device disposed in a vehicle seat sliding device will be described with reference to the drawings.

Figure 1:
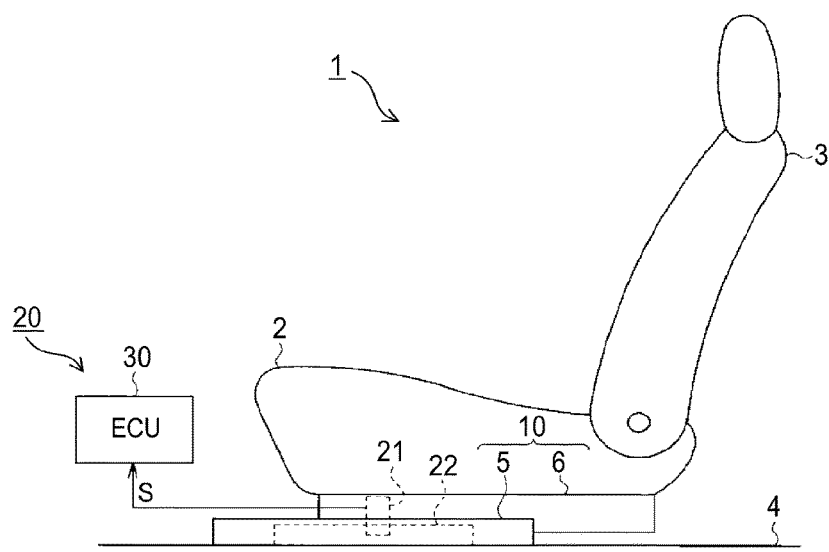
FIG. 1 is a schematic configuration diagram of a vehicle seat and a position detecting device disposed in a seat sliding device thereof.

As illustrated in FIG. 1, a vehicle seat 1 includes a seat cushion 2 and seat backrest 3 which is disposed so as to be tiltable to a rear end portion of the seat cushion 2. A pair of right and left lower rails 5 extending in a longitudinal direction of a vehicle are disposed on a floor 4 of the vehicle. Furthermore, upper rails 6 which are relatively movable on the lower rails 5 along an extending direction thereof are respectively mounted on the respective lower rails 5. The seat 1 according to the embodiment disclosed here is supported above a seat sliding device 10 formed by the lower rails 5 and the upper rails 6.

Figure 2:
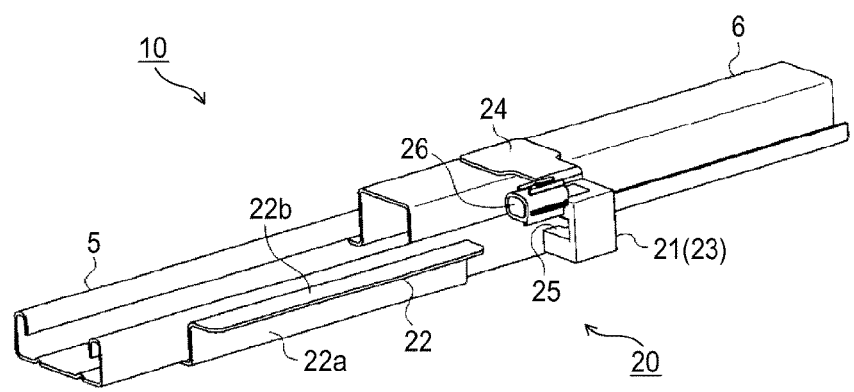
FIG. 2 is a perspective view of the seat sliding device and the position detecting device.

As illustrated in FIGS. 1 and 2, the seat sliding device 10 according to the embodiment disclosed here has a position detecting device 20 which detects a relative movement position of the upper rails 6 with respect to the lower rails 5 fixed to the floor 4, that is, a sliding position of the seat 1 supported above the seat sliding device 10. The lower rail 5 corresponds to a stationary member, and the upper rail 6 corresponds to a movable member.

Figure 3:
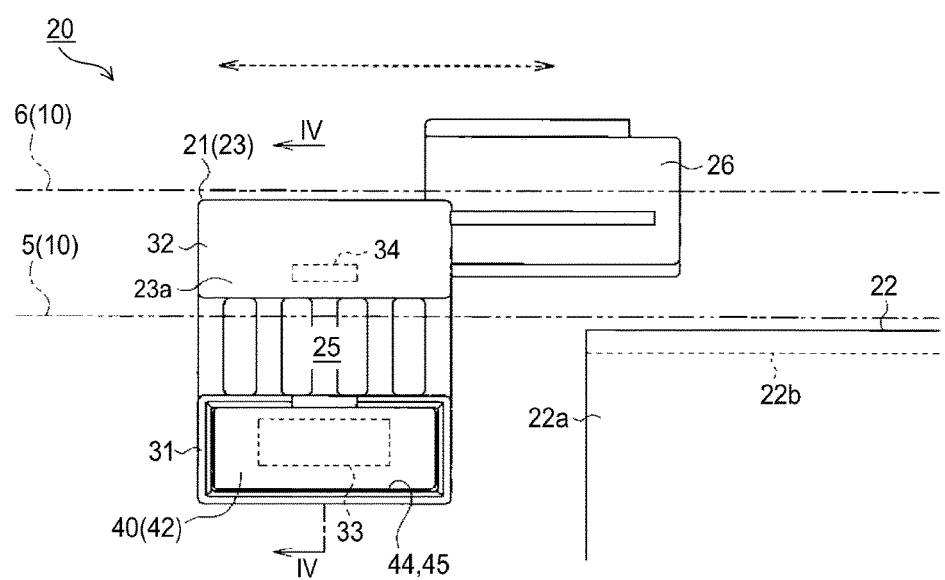
FIG. 3 is a side view of the position detecting device.

More specifically, as illustrated in FIGS. 1 to 3, the position detecting device 20 according to the embodiment disclosed here includes a device main body 21 which is disposed on the upper rail 6 side of the seat sliding device 10, and a detection target 22 which is disposed on the lower rail 5 side.

Figure 4:
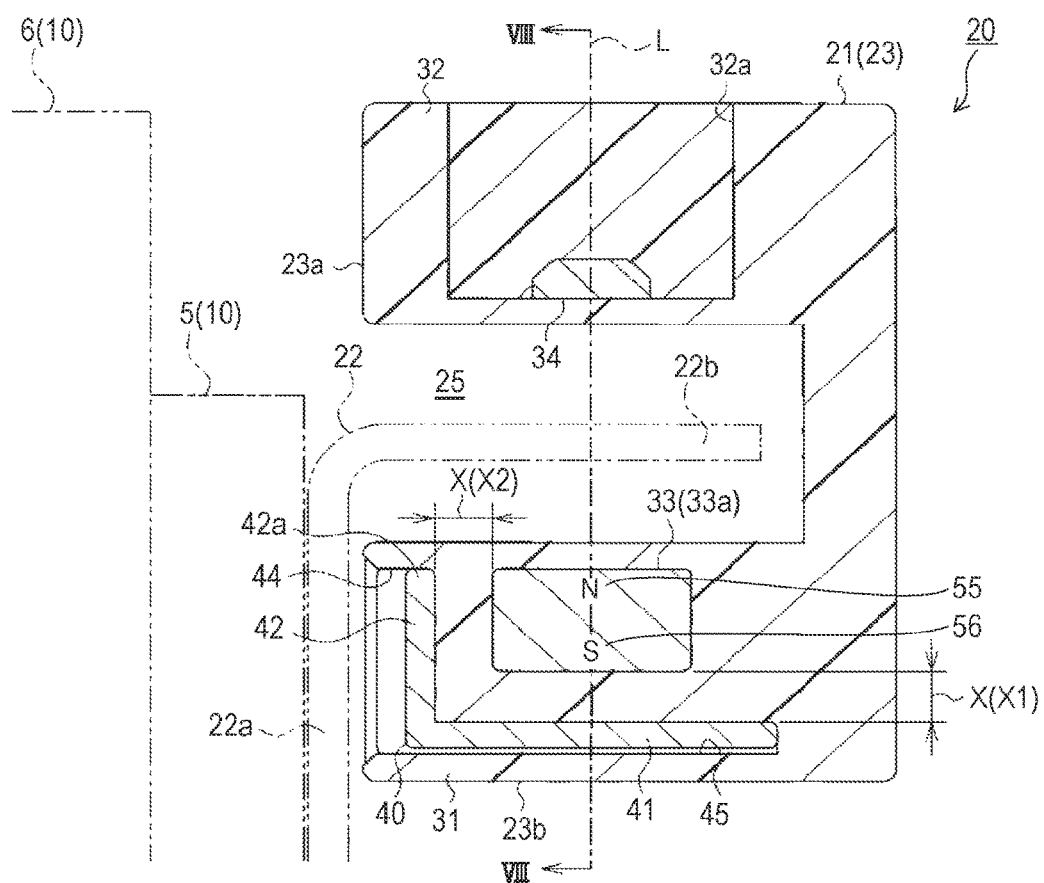
FIG. 4 is a cross-sectional view of the position detecting device (cross-sectional view taken along IV-IV line in FIG. 3)

As illustrated in FIGS. 2 to 4, the detection target 22 according to the embodiment disclosed here includes a vertical wall portion 22a which is erected on a side of the lower rail 5, and a flange-shaped horizontal wall portion 22b which extends toward an outer side (right side in FIG. 4) in a width direction of the lower rail 5 from an upper end of the vertical wall portion 22a. In the embodiment disclosed here, the detection target 22 is formed by performing plasticity processing (roll processing) on a plate member made of iron-based metal. In the seat sliding device 10 according to the embodiment disclosed here, the detection target 22 is assembled to the lower rail 5 so as to be arranged on a side of the lower rail 5.

In contrast, the device main body 21 according to the embodiment disclosed here includes a housing 23 which is fixed to the upper rail 6. Specifically, the housing 23 according to the embodiment disclosed here is fixed to the upper rail 6 via a support bracket 24 so as to be arranged on a side of the upper rail 6. The housing 23 has a detection opening 25 formed in such a way that a side surface 23a on the upper rail 6 side is cut out into a slit shape extending along the extending direction (lateral direction in FIG. 3) of the upper rail 6. The device main body 21 according to the embodiment disclosed here adopts a configuration in which the horizontal wall portion 22b of the above-described detection target 22 enters and exits from the inside of the detection opening 25, based on the relative movement of the upper rail 6 with respect to the lower rail 5.

As illustrated in FIG. 1, the device main body 21 according to the embodiment disclosed here is configured to output a detection signal S which can determine whether or not the horizontal wall portion 22b of the detection target 22 has entered the inside of the detection opening 25. According to the embodiment disclosed here, a connector portion 26 for power supplying and signal outputting is disposed in one end of the housing 23 (refer to FIGS. 2 and 3). Furthermore, the detection signal S output from the device main body 21 is input to an ECU 30 functioning as a detection determination unit. In this manner, the position detecting device 20 according to the embodiment disclosed here can detect a relative position of the upper rail 6 with respect to the lower rail 5, that is, a seat sliding position.

Specifically, as illustrated in FIGS. 1 and 2, the position detecting device 20 according to the embodiment disclosed here is brought into a state where (the horizontal wall portion 22b of) the detection target 22 enters the inside of the detection opening 25 formed in the device main body 21, when the seat 1 supported above the upper rail 6 is moved to the front side of the vehicle. That is, based on the detection signal S output from the device main body 21, the ECU 30 according to the embodiment disclosed here determines whether the seat sliding position is located either at a first position where the seat 1 is moved to the front side of the vehicle or at a second position where the seat 1 is moved to the rear side of the vehicle. In this manner, for example, the position detecting device 20 according to the embodiment disclosed here can perform optimized deployment control for an air bag (not illustrated), based on the detected seat sliding position in the vehicle having the position detecting device 20.

More specifically, as illustrated in FIGS. 3 and 4, the housing 23 according to the embodiment disclosed here includes a pair of arm units 31 and 32 which are installed parallel to each other in a vertically opposing state across the above-described detection opening 25. The position detecting device 20 according to the embodiment disclosed here includes a magnet 33 and a magnetic sensor 34 which are arranged apart from both the arm units 31 and 32.

Specifically, the housing 23 is fixed to the upper rail 6 so that the magnet 33 is disposed in the first arm unit 31 arranged on a lower side (lower side in each drawing) and the magnetic sensor 34 is disposed in the second arm unit 32 arranged on an upper side (upper side in each drawing). The magnet 33 according to the embodiment disclosed here is embedded into the first arm unit 31 in a state where an N-pole (first magnetic pole) 55 faces the upper side, that is, the N-pole 55 faces the magnetic sensor 34 side held by the second arm unit 32. The magnetic sensor 34 according to the embodiment disclosed here is embedded into the second arm unit 32 at a position where the magnetic sensor 34 opposes a magnetic pole center of the magnet 33 (position on a straight line L in FIG. 4).

The housing 23 according to the embodiment disclosed here is integrally formed using an insert molding method in which the magnet 33 is inserted into a resin. A Hall element is used as a magnetic element of the magnetic sensor 34. The magnetic sensor 34 according to the embodiment disclosed here is resin-molded into an accommodation recess 32a formed in the second arm unit 32.

Figure 5:
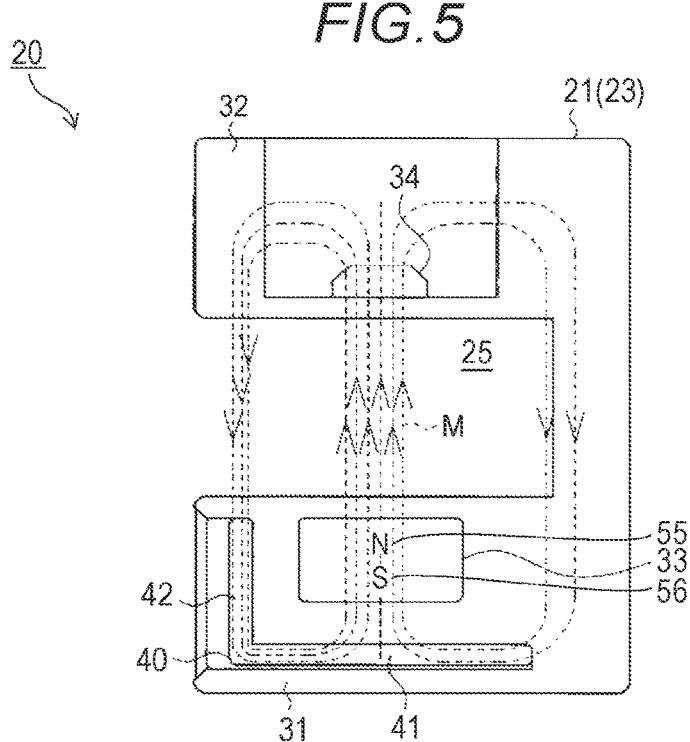
FIG. 5 is a view for describing an operation of the position detecting device and a magnetic shield disposed in the position detecting device (when a detection target does not enter)

As illustrated in FIG. 5, the position detecting device 20 according to the embodiment disclosed here adopts a configuration in which magnetic flux M of the magnet 33 held in the first arm unit 31 of the housing 23 passes through the magnetic sensor 34 held in the second arm unit 32 across the detection opening 25.

Figure 6:
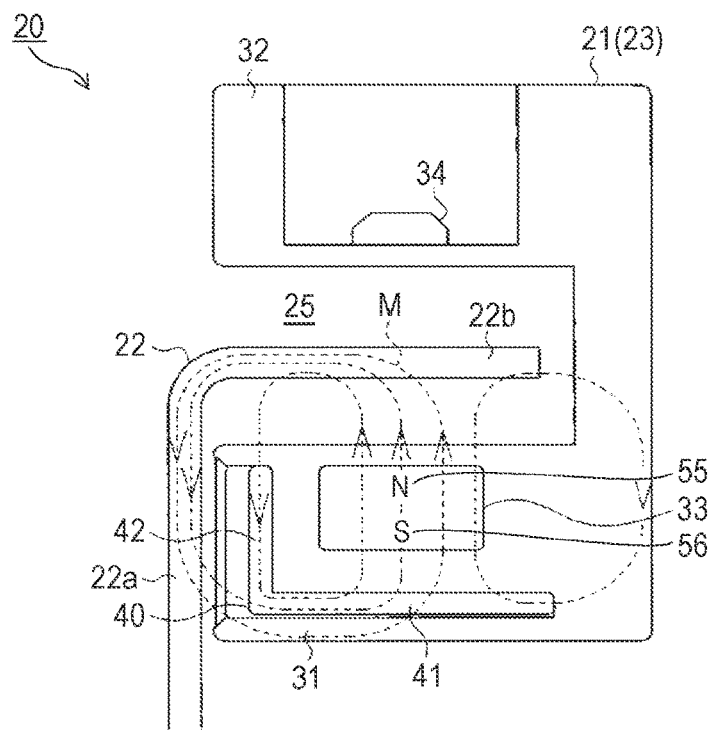
FIG. 6 is a view for describing an operation of the position detecting device and the magnetic shield disposed in the position detecting device (when the detection target enters)

As illustrated in FIG. 6, based on the relative movement of the upper rail 6 with respect to the lower rail 5, the horizontal wall portion 22b of the detection target 22 enters the inside of the detection opening 25, thereby forming a new magnetic flux route which passes through the detection target 22 formed of a magnetic material. That is, the magnetic flux M of the magnet 33 which extends to the second arm unit 32 side where the magnetic sensor 34 is disposed is shielded. In this manner, the position detecting device 20 according to the embodiment disclosed here is configured so that the magnetic flux M of the magnet 33 does not reach the magnetic sensor 34.

The magnetic sensor 34 according to the embodiment disclosed here detects a change in magnetic flux generated by the detection target 22 entering between the magnetic sensor 34 and the magnet 33 in this way. The device main body 21 according to the embodiment disclosed here is configured to output an output signal of the magnetic sensor 34 to the ECU 30 as the above-described detection signal S.

As illustrated in FIG. 4, the position detecting device 20 according to the embodiment disclosed here includes a magnetic shield 40 which has a magnetic gap (air gap) X between the magnet 33 and the magnetic shield 40, and which is formed of a magnetic material disposed below the magnet 33, that is, on a second magnetic pole (S-pole) 56 side opposite to the first magnetic pole (N-pole) 55 facing the upper side on which the magnetic sensor 34 side is located.

More specifically, the magnetic shield 40 is formed by performing plasticity processing on iron-based metal (for example, by performing bending processing on a plate material). Specifically, the magnetic shield 40 includes a first shielding wall 41 which spreads in a direction intersecting a magnetic pole direction (direction along straight line L extending in a vertical direction in FIG. 4) in which the first magnetic pole (N-pole) 55 and the second magnetic pole (S-pole) 56 of the magnet 33 are arrayed in parallel, specifically, which spreads on its orthogonal plane. Furthermore, the magnetic shield 40 includes a second shielding wall 42 which extends in the above-described magnetic pole direction from one end of the first shielding wall 41 so as to be arranged on a side (left side in FIG. 4) of the magnet 33. In the position detecting device 20 according to the embodiment disclosed here, the magnetic shield 40 is held in the first arm unit 31 of the housing 23 in a state where the second shielding wall 42 is arranged between the magnet 33 and the vertical wall portion 22a of the detection target 22.

According to the embodiment disclosed here, the side surface 23a on the upper rail 6 side in the first arm unit 31 has an accommodation recess 44 which extends in the extending direction and the vertical direction (refer to FIG. 3, the lateral direction and the vertical direction in the drawing) of the upper rail 6. One end on the lower side in the accommodation recess 44 has an insertion recess 45 which extends downward from the magnet 33. The magnetic shield 40 according to the embodiment disclosed here is attached to the first arm unit 31 in such a way that the first shielding wall 41 is inserted into the insertion recess 45.

The second shielding wall 42 is accommodated inside the accommodation recess 44 in a state where a distal end portion 42a extending from one end portion of the first shielding wall 41 is arranged at a vertical position which is approximately equal to a position of a first magnetic pole end surface (N-pole end surface) 33a of the magnet 33. In this manner, the magnetic shield 40 according to the embodiment disclosed here forms a predetermined magnetic gap X1 between the first shielding wall 41 and the magnet 33, and forms a predetermined magnetic gap X2 between the second shielding wall 42 and the magnet 33. In this state, the magnetic shield 40 is held below the magnet 33.

That is, as illustrated in FIGS. 5 and 6, the magnetic shield 40 is disposed on the second magnetic pole (S-pole side) 56 side of the magnet 33, thereby forming a magnetic flux route which passes through the first shielding wall 41 arranged below the magnet 33 and the second shielding wall 42 arranged on the side of the magnet 33. In this manner, the position detecting device 20 according to the embodiment disclosed here is configured to shield the magnetic flux M of the magnet 33 which extends to the lower side of the housing 23 so as to prevent a foreign substance from being adsorbed to (a lower surface 23b of) the housing 23.

As described above, according to the embodiment disclosed here, the following advantageous effects can be obtained.

(1) The magnetic shield 40 includes the first shielding wall 41 which spreads in the direction intersecting the magnetic pole direction in which the first magnetic pole (N-pole) 55 and the second magnetic pole (S-pole) 56 of the magnet 33 are arrayed in parallel. Adopting this configuration can effectively shield the magnetic flux M of the magnet 33 which extends to the side opposite to the first magnetic pole (N-pole) 55 facing the magnetic sensor 34 side. In this manner, it is possible to prevent foreign substance adsorption.

In particular, according to a configuration in which the magnet 33 is arranged below the magnetic sensor 34, a foreign substance on the floor 4 is likely to be adsorbed to the second magnetic pole (S-pole) 56 side. However, according to the above-described configuration, magnetic force (returning magnetic flux) of the magnet 33 is less likely to reach the foreign substance on the floor 4. In this manner, it is possible to effectively prevent foreign substance adsorption.

The magnetic flux route which passes through the magnetic shield 40 arranged on the second magnetic pole (S-pole) 56 side of the magnet 33 is formed, thereby strengthening magnetic force on the first magnetic pole (N-pole) 55 side. This increases the magnetic flux which passes through the magnetic sensor 34 (reachable magnetic force increases). Accordingly, it is possible to improve accuracy in detecting the detection target 22. As a result, it is possible to prevent a problem of variations in a separation distance between the magnet 33 and the magnetic sensor 34, which are caused by manufacturing and assembling errors.

Furthermore, the magnetic shield 40 can shield a disturbing magnetic field. In this manner, it is possible to extend durability by minimizing demagnetizing action occurring due to the disturbing magnetic field.

(2) The magnetic shield 40 includes the second shielding wall 42 which extends from the first shielding wall 41 in the magnetic pole direction so as to be arranged on the side of the magnet 33. In this manner, a shielding effect of the magnetic shield 40 can be improved. As a result, it is possible to more effectively prevent foreign substance adsorption. Then, it is possible to minimize the influence of the disturbing magnetic field.

In particular, according to a configuration in which the vertical wall portion 22a configuring the support portion of the detection target 22 is arranged on the side of the magnet 33, since the magnetic flux route which passes through the vertical wall portion 22a is formed, magnetic force of the magnet 33 is likely to reach a foreign substance on the floor 4. However, according to the above-described configuration, the magnetic flux route which passes through the magnetic shield 40 can be strengthened by using a magnetic flux collecting operation of the second shielding wall 42 arranged to oppose the vertical wall portion 22a of the detection target 22. This decreases the magnetic flux which reaches the foreign substance on the floor 4 of the vehicle. Therefore, it is possible to more effectively prevent foreign substance adsorption.

The above-described embodiment may be modified as follows.

According to the above-described embodiment, the magnetic shield 40 includes the first shielding wall 41 which spreads on the plane orthogonal to the magnetic pole direction in which the first magnetic pole (N-pole) 55 and the second magnetic pole (S-pole) 56 of the magnet 33 are arrayed in parallel, and the second shielding wall 42 which extends from one end of the first shielding wall 41 in the magnetic pole direction so as to be arranged on the side of the magnet 33. The second shielding wall 42 is arranged between the magnet 33 and the vertical wall portion 22a of the detection target 22. However, without being limited thereto, the configuration of the magnetic shield 40 may be optionally modified.

Figure 7A:
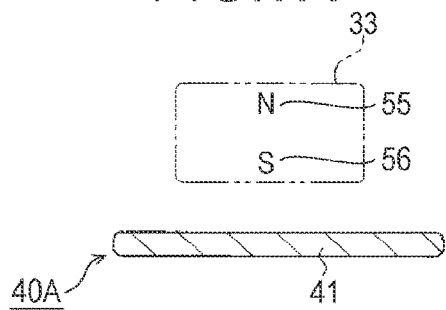
FIGS. 7A to 7H are cross-sectional views illustrating a configuration of a magnetic shield according to another example.
Figure 7B:
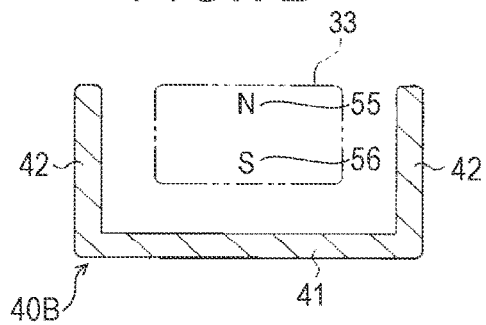

For example, as in a magnetic shield 40A illustrated in FIG. 7A, a configuration excluding the second shielding wall 42 may be adopted. For example, as in a magnetic shield 40B illustrated in FIG. 7B, a configuration may be adopted in which the second shielding wall 42 is also formed at any position other than the position where the second shielding wall 42 is arranged between the magnet 33 and the vertical wall portion 22*a* of the detection target 22.

Figure 8:
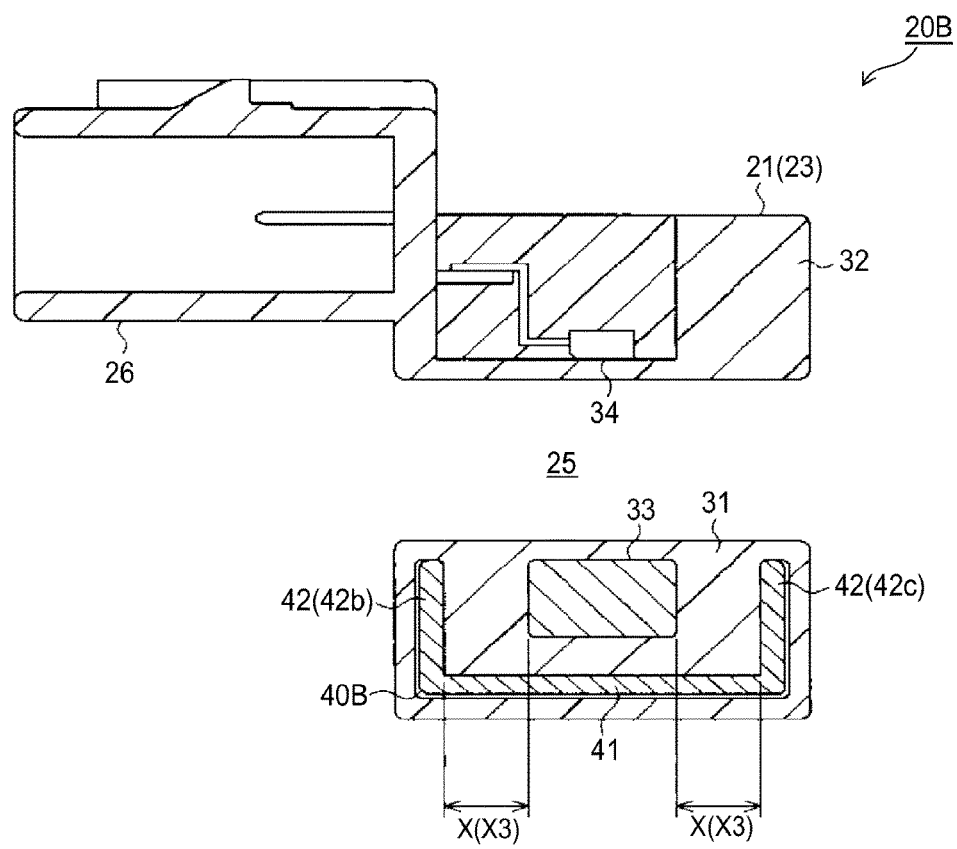
FIG. 8 is a cross-sectional view of the position detecting device which illustrates a configuration of the magnetic shield according to another example (cross-sectional view taken along VIII-VIII line in FIG. 4)

Specifically, as illustrated in FIG. 8, a configuration may be adopted in which the second shielding walls 42 (42*b* and 42*c*) of the magnetic shield 40B are also formed at two positions interposing the magnet 33 therein, in the lateral direction in the drawing, that is, in the direction in which the upper rail 6 relatively moves with respect to the lower rail 5 so as to cause (the horizontal wall portion 22*b* of) the detection target 22 to enter and exit from the detection opening 25 of the device main body 21. That is, a configuration may be adopted in which the second shielding wall 42 arranged between the vertical wall portion 22*a* of the detection target 22 and the magnet 33 is provided (refer to FIG. 4), and in which the second shielding wall 42 is additionally arranged so as to surround the magnet 33 in three directions. In a position detecting device 20B illustrated in FIG. 8, predetermined magnetic gaps X3 are respectively formed between the second shielding walls 42*b* and 42*c* and the magnet 33. In this manner, it is possible to obtain a more excellent shielding effect.

A configuration may be adopted in which the second shielding wall 42 is formed over the whole peripheral edge of the first shielding wall 41. A configuration may also be adopted in which the second shielding wall 42 is not partially formed in the peripheral edge of the first shielding wall 41.

Figure 7C:
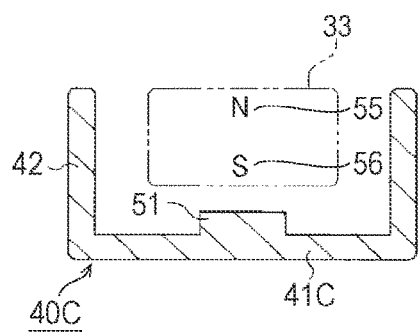

For example, as in a magnetic shield 40C illustrated in FIG. 7C, a configuration may be adopted which includes a first shielding wall 41C having a projection 51 projecting to the magnet 33 side. In this manner, it is possible to more effectively strengthen magnetic force on the first magnetic pole (N-pole) 55 side.

Figure 7D:
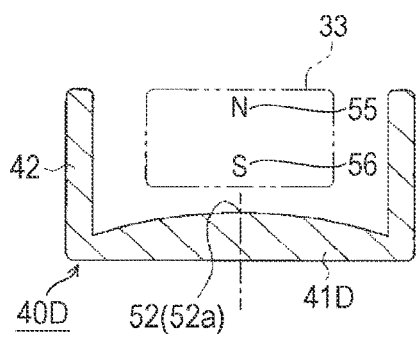
Figure 7E:
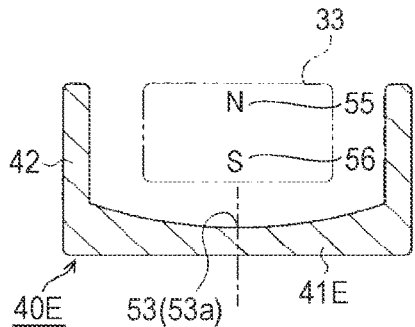

Furthermore, for example, as in a magnetic shield 40D illustrated in FIG. 7D, a configuration may be adopted which includes a first shielding wall 41D having a curved surface 52 having a central portion 52*a* at a position opposing the magnet 33 and protruding to the magnet 33 side. In this manner, the magnetic force on the first magnetic pole 55 side is strengthened, and a stabilized output of the magnetic force, specifically, an advantageous effect which reduces the influence of misalignment in the direction intersecting the magnetic pole direction (vertical direction in the drawing) can be expected. For example, as in a magnetic shield 40E illustrated in FIG. 7E, a configuration may be adopted which includes a first shielding wall 41E having a curved surface 53 having a central portion 53*a* at a position opposing the magnet 33 and recessed to the magnet 33 side. Even when this configuration is adopted, the stabilized output of the magnetic force can be expected.

Figure 7F:
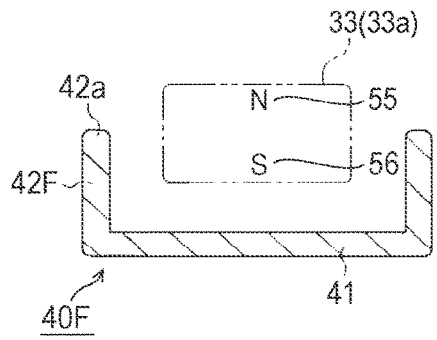

For example, as in a magnetic shield 40F illustrated in FIG. 7F, a configuration may be adopted in which the distal end portion 42*a* of a second shielding wall 42F extending from one end of the first shielding wall 41 along the magnetic pole direction is located on the first shielding wall 41 side (lower side in the drawing) rather than a first magnetic pole end surface 33*a* of the magnet 33.

That is, due to the magnetic flux collecting operation of the second shielding wall 42, magnetic flux components of the magnet 33 which extends to the magnetic sensor 34 side along the magnetic pole direction are attracted to the lateral side on which the second shielding wall 42 is arranged. This causes a possibility of the decreased magnetic flux which passes through the magnetic sensor 34. However, according to the above-described configuration, the magnetic flux components along the magnetic pole direction (vertical direction in the drawing) are less likely to be collected on the second shielding wall 42F. This can ensure high detection accuracy by preventing a decrease in the magnetic flux which passes through the magnetic sensor 34 while foreign substance adsorption and disturbing influence are prevented based on a shielding effect of the second shielding wall 42F.

Figure 7G:
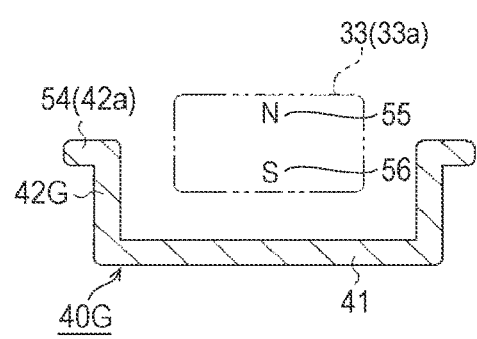
Figure 7H:
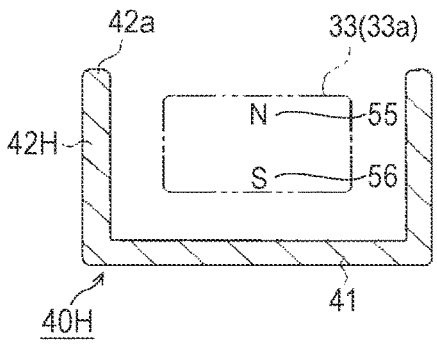

For example, as in a magnetic shield 40G illustrated in FIG. 7G, a flange portion 54 may be formed in the distal end portion 42*a* of a second shielding wall 42G. In this manner, while a decrease in magnetic flux components along the magnetic pole direction can be minimized, the magnetic flux which passes through the magnetic sensor 34 can be increased. For example, as in a magnetic shield 40H illustrated in FIG. 7H, a configuration is not excluded in which the distal end portion 42*a* of a second shielding wall 42H is located on the magnetic sensor 34 side (upper side in the drawing) rather than the first magnetic pole end surface 33*a* of the magnet 33.

Figure 9A:
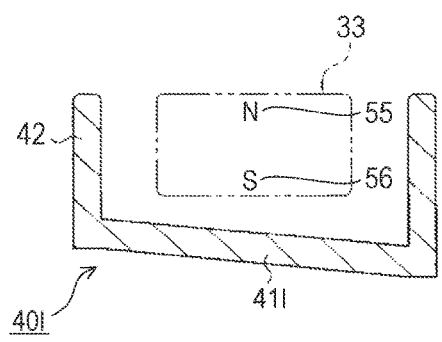
FIGS. 9A to 9D are cross-sectional views illustrating a configuration of the magnetic shield according to another example.
Figure 9B:
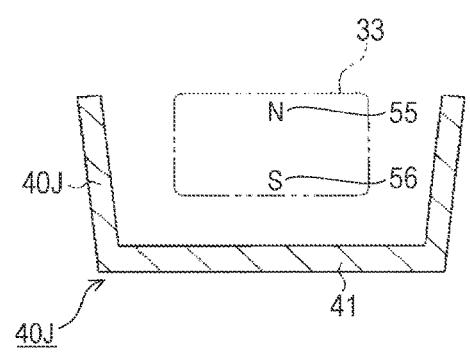
Figure 9C:
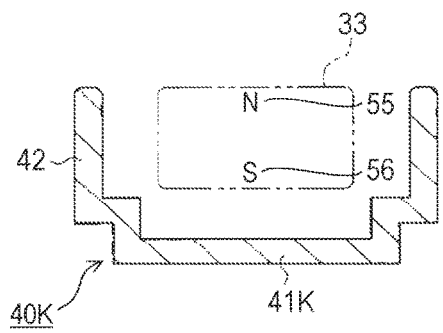

For example, as in a magnetic shield 40I illustrated in FIG. 9A, a first shielding wall 41I may not necessarily spread on a plane orthogonal to the magnetic pole direction. For example, as in a magnetic shield 40J illustrated in FIG. 9B, a second shielding wall 42J may not extend parallel to the magnetic pole direction. For example, as in a magnetic shield 40K illustrated in FIG. 9C, a configuration may be adopted which includes a first shielding wall 41K formed so that a portion opposing the magnet 33 is apart from the magnet 33. That is, the magnetic shield may not necessarily strengthen the magnetic force on the first magnetic pole 55 side.

Figure 9D:
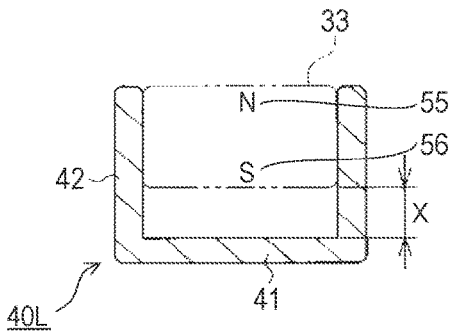

According to the above-described embodiment, the predetermined magnetic gap X2 is formed between the second shielding wall 42 and the magnet 33 (refer to FIG. 4). However, without being limited thereto, as in a magnetic shield 40L illustrated in FIG. 9D, as long as the magnetic gap X is formed between the first shielding wall 41 and the magnet 33, the magnetic gap may not necessarily be formed between the second shielding wall 42 and the magnet 33.

According to the above-described embodiment, the magnet 33 is arranged below the magnetic sensor 34. However, for example, a positional relationship thereof may be optionally changed by adopting a configuration in which the magnetic sensor 34 is arranged below the magnet 33, or a configuration in which the magnet 33 and the magnetic sensor 34 are horizontally arrayed in parallel.

According to the above-described embodiment, the Hall element is used as the magnetic element of the magnetic sensor 34. However, for example, other magnetic elements such as a magnetoresistive element may be used.

According to the above-described embodiment, a configuration has been described in which the N-pole of the magnet 33 serves as the first magnetic pole 55 so that the magnetic sensor 34 is arranged on the first magnetic pole 55 side, and in which the magnetic shield 40 is arranged on the S-pole side which serves as the second magnetic pole 56. However, a configuration may be adopted in which the S-pole of the magnet 33 serves as the first magnetic pole 55 and the N-pole serves as the second magnetic pole 56.

According to the above-described embodiment, in the detection target 22, the vertical wall portion 22a configuring the support portion and the horizontal wall portion 22b configuring the detection target portion are integrally formed by performing plasticity processing on a plate material. However, without being limited thereto, a configuration of the detection target 22 may be optionally changed. For example, a configuration may be adopted in which the support portion and the detection target portion which are separately formed are assembled to each other. A configuration of using a flat plate-shaped detection target may be adopted. Furthermore, the detection target 22 may not have a plate shape. When the device main body 21 is fixed to the upper rail 6 side as in the above-described embodiment, a configuration may be adopted in which a portion of the lower rail 5 is used as the detection target.

According to the above-described embodiment, the device main body 21 is disposed on the upper rail 6 side serving as the movable member side of the seat sliding device 10, and the detection target 22 is disposed on the lower rail 5 side serving as the stationary member. However, without being limited thereto, a configuration may be adopted in which the detection target 22 is disposed on the movable member side of the seat sliding device 10, and in which the device main body 21 is disposed on the stationary member side.

For example, without being limited to the upper rail 6, a support member of the seat 1 which is disposed on the upper rail 6 or a structure body of the seat 1 may serve as a stationary portion on the movable member side in the seat sliding device 10. For example, without being limited to the lower rail 5, a support member for supporting the lower rail 5 on the floor 4 or the floor 4 may serve as a stationary portion on the stationary member side in the seat sliding device 10.

According to the above-described embodiment, in the position detecting device 20 used in detecting the seat sliding position, the magnetic shield 40 is disposed on the second magnetic pole 56 side of the magnet 33. Without being limited thereto, as long as the magnetic sensor 34 is configured to detect a change in the magnetic flux generated by the detection target 22 entering between the magnet 33 and the magnetic sensor 34, the magnetic shield 40 which is the same as that according to the above-described embodiment may also be disposed in position detecting devices used for other purposes.

According to the above-described embodiment, when the seat 1 supported above the upper rail 6 moves to the front side of the vehicle, the detection target 22 is brought into a state of entering the inside of the detection opening 25 formed in the device main body 21. However, without being limited thereto, when the seat 1 moves to the rear side of the vehicle, the detection target 22 may be brought into a state of entering the inside of the detection opening 25 of the device main body 21.

According to the above-described embodiment, the housing 23 is integrally formed using an insert molding method in which the magnet 33 is inserted into a resin. However, after the housing 23 is formed, the magnet 33 may be assembled to the housing 23.

According to the above-described embodiment, the magnetic sensor 34 is resin-molded into the accommodation recess 32a formed in the second arm unit 32. However, for example, the magnetic sensor 34 may be sealed with another member (sealing member) assembled thereto.

According to the above-described embodiment, the magnetic shield 40 is assembled in such a way that the magnetic shield 40 is inserted into the accommodation recess 44 and the insertion recess 45 which are formed in the first arm unit 31. However, for example, a configuration may be adopted in which the magnetic shield 40 is inserted and formed integrally with the housing 23.

A position detecting device according to an aspect of this disclosure preferably includes a magnet that has a first magnetic pole and a second magnetic pole, a magnetic sensor that detects a change in magnetic flux generated by a detection target which enters between the magnet and the magnetic sensor on the first magnetic pole side of the magnet, and a magnetic shield that has a magnetic gap between the magnet and the magnetic shield, and that includes a magnetic material which is disposed on the second magnetic pole side of the magnet.

According to the above-described configuration, a magnetic flux route which passes through the magnetic shield is formed, thereby shielding the magnetic flux of the magnet which extends to a side opposite to a direction in which the magnetic sensor is disposed, that is, the magnetic flux on the second magnetic pole side. This can prevent foreign substance adsorption by using a simple configuration.

In the position detecting device, it is preferable that the magnetic shield includes a first shielding wall which spreads in a direction intersecting a magnetic pole direction in which the first magnetic pole and the second magnetic pole are arrayed in parallel.

According to the above-described configuration, the magnetic flux of the magnet can be more effectively shielded on the second magnetic pole side which is located on a side opposite to the first magnetic pole facing the magnetic sensor side.

In the position detecting device, it is preferable that the magnetic shield includes a second shielding wall which extends from the first shielding wall in the magnetic pole direction so as to be arranged on a side of the magnet.

According to the above-described configuration, a shielding effect of the magnetic shield can be improved. As a result, it is possible to more effectively prevent foreign substance adsorption.

In the position detecting device, it is preferable that the detection target includes a support portion which is arranged on the side of the magnet, and a detection target portion which is supported by the support portion so as to be arranged at a position where the detection target portion enters between the magnet and the magnetic sensor. Preferably, the second shielding wall is arranged between the magnet and the support portion of the detection target.

That is, when the magnetic flux route which passes through the detection target is formed, there is a possibility that the magnetic flux which passes through the support portion arranged on the side of the magnet may attract the foreign substance on the side opposite to the direction in which the magnetic sensor is disposed, that is, the foreign substance on the second magnetic pole side. However, according to the above-described configuration, a magnetic flux collecting operation of the second shielding wall arranged facing the support portion of the detection target can strengthen the magnetic flux route which passes through the magnetic shield. This can prevent foreign substance adsorption caused by the magnetic flux which passes through the support portion of the detection target.

In the position detecting device, it is preferable that the second shielding wall is disposed at a position of interposing the magnet therein in a direction where the detection target enters.

In the position detecting device, it is preferable that a distal end portion of the second shielding wall is located on the first shielding wall side rather than a first magnetic pole end surface of the magnet.

That is, the magnetic flux route which passes through the first shielding wall arranged on the second magnetic pole side of the magnet is formed, thereby strengthening a magnetic force on the first magnetic pole side. This increases the magnetic flux which passes through the magnetic sensor (reachable magnetic force increases), thereby improving accuracy in detecting the detection target. However, due to the magnetic flux collecting operation of the second shielding wall, magnetic flux components of the magnet extending to the magnetic sensor side along the magnetic pole direction are attracted to the lateral side on which the second shielding wall is arranged. This causes a possibility of the decreased magnetic flux which passes through the magnetic sensor.

In this regard, according to the above-described configuration, the magnetic flux components of the magnet along the magnetic pole direction are less likely to be collected on the second shielding wall. This can ensure high detection accuracy by preventing a decrease in the magnetic flux which passes through the magnetic sensor while foreign substance adsorption is prevented based on a shielding effect of the second shielding wall.

In the position detecting device, it is preferable that the first shielding wall includes a projection which projects to the magnet side.

According to the above-described configuration, it is possible to strengthen the magnetic force of the magnet on the first magnetic pole side. This can increase the magnetic flux which passes through the magnetic sensor. Therefore, it is possible to improve accuracy in detecting the detection target.

In the position detecting device, it is preferable that the first shielding wall includes a curved surface which has a center portion at a position where the first shielding wall faces the magnet.

According to the above-described configuration, a stabilized output of the magnetic force, specifically, an advantageous effect which reduces the influence of misalignment in the direction intersecting the magnetic pole direction can be expected.

In the position detecting device, it is preferable that the position detecting device is disposed in a seat sliding device which has a stationary member and a movable member disposed so as to be relatively movable with respect to the stationary member. Preferably, the magnetic sensor and the magnet are disposed on the movable member side of the seat sliding device. Preferably, the detection target is disposed on the stationary member side of the seat sliding device, and the magnet is disposed below the magnetic sensor.

That is, according to a configuration in which the magnet is arranged below the magnetic sensor, a foreign substance on a floor located on the second magnetic pole side is likely to be adsorbed. However, since the magnetic shield is disposed on the second magnetic pole side, the magnetic force of the magnet is less likely to reach the foreign substance on the floor. This can effectively prevent the foreign substance adsorption even when the position detecting device is disposed in the seat sliding device as in the above-described configuration.

According to the aspect of this disclosure, it is possible to prevent foreign substance adsorption by using a simpler configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A position detecting device comprising:
   a magnet that has a first magnetic pole and a second magnetic pole;
   a magnetic sensor that detects a change in magnetic flux generated by a detection target which enters between the magnet and the magnetic sensor on the first magnetic pole side of the magnet;
   a magnetic shield that shields a disturbing magnetic field and that includes a magnetic material which is disposed on the second magnetic pole side of the magnet; and
   a housing that contains the magnet, the magnetic sensor, and the magnetic shield,
   wherein the magnetic shield includes a first shielding wall which spreads in a direction intersecting a direction of a magnetization axis connecting the first magnetic pole and the second magnetic pole, and a second shielding wall which extends from the first shielding wall in the direction parallel to the magnetization axis so as to be arranged on a side of the magnet,
   wherein the magnetic shield is arranged in the housing so there is a first magnetic gap between the magnet and the first shielding wall and a second magnetic gap between the magnet and the second shielding wall, and
   wherein the magnet, the magnetic sensor, and the magnetic shield are integrally formed in the housing with resin.

2. The position detecting device according to claim 1,
   wherein the detection target includes a support portion which is arranged on the side of the magnet, and a detection target portion which is supported by the support portion so as to be arranged at a position where the detection target portion enters between the magnet and the magnetic sensor, and
   wherein the second shielding wall is arranged between the magnet and the support portion of the detection target.

3. The position detecting device according to claim 2,
   wherein the second shielding wall is disposed at a position for interposing the magnet therein in a direction where the detection target enters.

4. The position detecting device according to claim 1,
wherein a distal end portion of the second shielding wall is located on the first shielding wall side rather than a first magnetic pole end surface of the magnet.

5. The position detecting device according to claim 1, wherein the first shielding wall includes a projection which projects to the magnet side.

6. The position detecting device according to claim 1, wherein the first shielding wall includes a curved surface which has a center portion at a position where the first shielding wall opposes the magnet.

7. The position detecting device according to claim 1, wherein the position detecting device is disposed in a seat sliding device which has a stationary member and a movable member disposed so as to be relatively movable with respect to the stationary member,
wherein the magnetic sensor and the magnet are disposed on the movable member side of the seat sliding device,
wherein the detection target is disposed on the stationary member side of the seat sliding device, and
wherein the magnet is disposed below the magnetic sensor.

8. The position detecting device according to claim 1, wherein the magnetic shield prevents foreign substance absorption by the magnet by shielding the disturbing magnetic field.

9. The position detecting device according to claim 1,
wherein the second shielding wall extends from a first end of the first shielding wall,
wherein the magnetic shield includes a third shielding wall that extends from a second end of the first shielding wall in the direction parallel to the magnetization axis, and
wherein a third magnetic gap is arranged between the magnet and the third shielding wall.

\* \* \* \* \*